(12) United States Patent
Kersting

(10) Patent No.: US 8,882,627 B2
(45) Date of Patent: Nov. 11, 2014

(54) ELECTRIC VARIABLE TRANSMISSION FOR HYBRID ELECTRIC VEHICLES WITH FOUR FORWARD MODES AND SIX FIXED GEARS

(75) Inventor: Klaus Kersting, Birmingham, MI (US)

(73) Assignees: Daimler AG, Stuttgart (DE); Chrysler Group LLC, Auburn Hills, MI (US)

( * ) Notice: Subject to any disclaimer, the term of this patent is extended or adjusted under 35 U.S.C. 154(b) by 983 days.

(21) Appl. No.: 12/113,973

(22) Filed: May 2, 2008

(65) Prior Publication Data

US 2009/0275436 A1 Nov. 5, 2009

(51) Int. Cl.
| | |
|---|---|
| *F16H 3/62* | (2006.01) |
| *F16H 3/72* | (2006.01) |
| *B60K 6/445* | (2007.10) |
| *B60K 6/365* | (2007.10) |
| *B60K 6/547* | (2007.10) |
| *B60K 6/26* | (2007.10) |
| *F16H 37/10* | (2006.01) |
| *B60K 1/02* | (2006.01) |

(52) U.S. Cl.
CPC ........... *B60K 6/445* (2013.01); *F16H 2037/102* (2013.01); *F16H 2037/108* (2013.01); *F16H 2037/104* (2013.01); *F16H 2200/201* (2013.01); *F16H 3/728* (2013.01); *F16H 2200/2043* (2013.01); *Y02T 10/6239* (2013.01); *B60K 6/365* (2013.01); *B60K 1/02* (2013.01); *B60K 6/547* (2013.01); *B60K 6/26* (2013.01)

USPC .......................................... 475/275; 475/286

(58) Field of Classification Search
None
See application file for complete search history.

(56) References Cited

U.S. PATENT DOCUMENTS

| | | | |
|---|---|---|---|
| 2003/0078126 A1 | 4/2003 | Holmes et al. | |
| 2007/0225097 A1* | 9/2007 | Raghavan et al. | 475/5 |
| 2008/0015073 A1* | 1/2008 | Raghavan et al. | 475/5 |
| 2008/0176704 A1* | 7/2008 | Raghavan et al. | 475/275 |

* cited by examiner

*Primary Examiner* — Erin D Bishop
(74) *Attorney, Agent, or Firm* — Ralph E. Smith

(57) ABSTRACT

The present disclosure provides a power split transmission with four Electric Variable Transmission (EVT) modes and six fixed gears for use in hybrid electrical vehicles (HEV). The present disclosure utilizes two electric motors ("E-motors"), an engine, three planetary gear sets, and five selectively engageable clutches. The clutches are engaged in different combinations to engage the different gears and EVT modes. In the six fixed gears, power is transmitted only on the mechanical path for the highest transmission efficiency. In the four EVT modes, a part of the power is transmitted electrically. The EVT modes are designed for the lowest power split ratios, allowing the use of low powered E-motors. Additionally, the present disclosure can include a front E-motor design allowing scalable E-motors and a modular transmission design, and a middle E-motor design.

9 Claims, 3 Drawing Sheets

ELECTRIC VARIABLE TRANSMISSION FOR HYBRID ELECTRIC VEHICLES WITH FOUR FORWARD MODES AND SIX FIXED GEARS

FIELD OF THE DISCLOSURE

The present disclosure relates generally to vehicle transmissions, and more specifically, the present disclosure relates to a power split transmission capable of four Electric Variable Transmission (EVT) modes and six fixed gears for hybrid electrical vehicles (HEV).

BACKGROUND OF THE DISCLOSURE

A Power Split Transmission (PST) (also known as an Electric Variable Transmission (EVT)) is one type of transmission used for Hybrid Electric Vehicles (HEV). Power split transmissions utilize two electric motors ("E-motors") and require completely new transmission designs over conventional transmissions and existing HEV transmissions with a single E-motor. Power split transmissions utilize epicyclic differential gearing (i.e., planetary gear sets) in a way that a part of the power of the internal combustion engine is transmitted through a mechanical path to the output, and another part is transmitted on an electrical path. The electrical path includes the two E-motors, one of them operating as a motor, and the other as a generator. By varying the speeds of the E-motors, variable transmission ratios are obtained.

Typically, the PST allows no carry over of parts from conventional transmissions resulting in large development costs. However, HEVs with PSTs provide improved fuel economy over traditional series and parallel hybrids because the E-motors not only boost or regenerate during braking, but also drive in variable ratios. Those operations are done in EVT modes. Conventional geared transmissions have a certain number (e.g., four to seven) of gears with fixed ratios. Variable ratios in the EVT modes allow the engine to operate near the best efficient load point. In existing HEV PSTs, high-power E-motors and power electronics are required in order to cover full load engine operation. Existing power split transmissions do not include very, low power split ratios, six well-distributed gears, and a front E-motor design.

BRIEF SUMMARY OF THE DISCLOSURE

In various exemplary embodiments, the present disclosure provides a power split transmission with four Electric Variable Transmission (EVT) modes and six fixed gears for use in hybrid electrical vehicles (HEV). The present disclosure utilizes two electric motors ("E-motors"), an engine, three planetary gear sets, and five selectively engageable clutches. The clutches are engaged in different combinations to engage the different gears and EVT modes; In the six fixed gears, power is transmitted only on the mechanical path for the highest transmission efficiency. In the four EVT modes, a part of the power is transmitted electrically. The EVT modes are designed for the lowest power split ratios, allowing the use of low powered E-motors; Additionally, the present disclosure can include front E-motor design allowing scalable E-motors and a modular transmission design. Alternatively, the E-motors can be located in the middle integrated with the transmission, design.

In an exemplary embodiment of the present disclosure, an electric variable transmission with four forward modes and six fixed gears includes a first, second, and third planetary gear set, wherein the first, second, and third planetary gear sets are interconnected; an input shaft connected to the third planetary gear set; a first electric motor connected to third planetary gear set-and connected to the first planetary gear set through a first selectively engageable clutch; a second electric motor connected to the first planetary gear set and connected to the second planetary gear set through a second selectively engageable clutch; a transmission housing connected to the first planetary gear set through a third selectively engageable clutch and to the second planetary gear set through a fourth selectively engageable clutch; a fifth selectively engageable clutch connected within the third planetary gear set; and an output shaft connected to the second planetary gear set. The first and third planetary gear sets include a simple planetary gear set, and the second planetary gear set includes a compound planetary gear set. The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and second planetary pinions rotatably mounted On a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

Optionally; connections in the electric variable transmission include: the input shaft connected to the third ring gear; the first electric motor connected to the third sun gear and to the first ring gear through the first selectively engageable clutch; the second electric motor connected to the first sun gear and to the second planetary carrier through the second selectively engageable clutch; the first ring gear connected to the transmission housing through the third selectively engageable clutch; the first planetary carrier connected to the second sun gear; the second sun gear connected to the third planetary carrier; the second planetary carrier connected to the transmission housing through the fourth selectively engageable clutch; the second ring gear connected to the output shaft; and the third sun gear connected to the third ring gear through the fifth selectively engageable clutch. The first and second electric motors are disposed in front of the first, secondhand third planetary gear sets. The electric variable transmission includes four electric variable transmission modes and six fixed gears, and the four electric variable transmission modes and six fixed, gears are selectively engageable through the first, second, third, fourth, and fifth selectively engageable clutches.

In another exemplary embodiment of the present disclosure, an electric variable transmission with four forward modes and six fixed gears includes a first, second, and third planetary gear set, wherein the first, second, and third planetary gear sets are interconnected; an input shaft connected to the first planetary gear set; a first electric motor connected to me first planetary gear set and connected to the second planetary gear set through a first selectively engageable clutch; a second electric motor connected to the second planetary gear set and connected to the third planetary gear set through a second selectively engageable clutch; a transmission housing connected to the second planetary gear set through a third selectively engageable clutch and to the third planetary gear set through a fourth selectively engageable clutch; a fifth selectively engageable clutch connected within the first planetary gear set; and an output shaft connected to the third planetary gear set. The first and third planetary gear sets include a compound planetary gear set, and the second planetary gear set includes a simple planetary gear set. The first planetary gear set includes a first sun gear, a first ring gear, and first planetary pinions rotatably mounted on a first planetary carrier, wherein the first planetary pinions are disposed in a meshing relationship with the first sun and first ring gears. The second planetary gear set includes a second sun gear, a second ring gear, and a second planetary pinion rotatably mounted on a second planetary carrier, wherein the second planetary pinion is disposed in a meshing relationship with the second sun and second ring gears. The third planetary gear set includes a third sun gear, a third ring gear, and third planetary pinions rotatably mounted on a third planetary carrier, wherein the third planetary pinions are disposed in a meshing relationship with the third sun and third ring gears.

Optionally, connections in the electric variable transmission include: the input shaft connected to the first planetary carrier; the first electric motor connected to the first sun gear and to the second ring gear through the first selectively engageable clutch; the second electric motor connected to the second sun gear and to the third planetary carrier through the second selectively engageable clutch; the first ring gear connected to the second planetary carrier and the third sun gear; the first planetary carrier connected to the first sun gear through the fifth selectively engageable clutch; the second sun gear connected to the third planetary carrier through the second selectively engageable clutch; the second planetary carrier connected to the third ring gear, the second ring gear connected to the transmission housing, though the first selectively engageable clutch; and the third planetary carrier connected to the transmission housing through the fourth selectively engageable clutch. The first and second electric motors are disposed in front of the first, second, and third planetary gear sets. The electric variable transmission includes four electric variable transmission modes and six fixed gears, and the four electric variable transmission modes and six fixed gears are selectively engageable through the first, second, third, fourth, and fifth selectively engageable clutches.

In yet another exemplary embodiment of the present disclosure, an electric variable transmission with four forward modes, six fixed gears, and a middle electric motor design includes a first* second, and third planetary gear set, wherein the first, second, and third planetary gear sets are interconnected; an input shaft connected to the third planetary gear set; a first electric motor connected to the third planetary gear set and connected to the first planetary gear set through a first selectively engageable clutch; a second electric motor connected to the first planetary gear set and connected to the second planetary gear set through a second selectively engageable clutch; a transmission housing connected to the first planetary gear set through a third selectively engageable clutch and to the second planetary gear set through a fourth selectively engageable clutch; a fifth selectively engageable clutch connected within the third planetary gear set; and an output shaft connected to the second planetary gear set. The first and third planetary gear sets include a simple planetary gear set, and the second planetary gear set includes a compound planetary gear set. The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and second planetary pinions rotatably mounted on a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

Optionally, connections in the electric variable transmission include: the input shaft connected to the third ring gear; the first electric motor connected to the third sun gear and to the first ring gear through the first selectively engageable clutch; the second electric motor connected to the first sun gear and to the second planetary carrier through the second selectively engageable clutch; the first ring gear connected to the transmission housing through the third selectively engageable clutch and to the first electric motor and the third sun gear through the first selectively engageable clutch; the first planetary carrier connected to the second sun gear; the second sun gear connected to the first planetary carrier and the third planetary carrier; the second planetary carrier connected to the transmission housing through the fourth selectively engageable clutch; the second ring gear connected to the output shaft; and the third ring gear connected to the input shaft and to the third sun gear through the fifth selectively engageable clutch. The first electric motor is disposed in front of the first, second, and third planetary gear sets, and the second electric motor is disposed in between the first and second planetary gear sets. The electric variable transmission includes four, electric variable transmission modes and six fixed gears, and the four electric variable transmission modes and six fixed gears are selectively engageable through the first, second, third, fourth; and fifth selectively engageable clutches.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

In various exemplary embodiments, the present disclosure provides a power split transmission with four Electric Variable Transmission (EVT) modes and six fixed gears for use in hybrid electrical vehicles (HEV). The present disclosure utilizes two electric motors ("E-motors"), an engine, three planetary gear sets, and five selectively engageable clutches. The clutches are engaged in different combinations to engage the different gears and EVT modes: In the six fixed gears, power is transmitted only on the mechanical path for the highest transmission efficiency. In the four EVT modes, a part of the power is transmitted electrically and a part is transmitted mechanically. The EVT modes are designed for the lowest power split ratios, allowing the use of low powered E-motors. Additionally, the present disclosure includes a front E-motor designed allowing scalable E-motors and a modular transmission design. Alternatively, the E-motors can be located in the middle integrated with the transmission design.

The present disclosure provides four forward EVT modes and six fixed gears to enable both an optimal fuel efficiency and excellent performance. Generally, EVT modes are more efficient in low load operation, such as for city driving. Fixed gears are more efficient for higher load operation. The present disclosure utilizes five clutches and three planetary gear sets to provide the four EVT modes and six fixed gears. The four EVT modes are designed to cover any ratio, i.e. full coverage. The six fixed gears have fixed ratios, and are generally used at full and high loads.

The various exemplary embodiments of the multi-mode power split transmission with four EVT modes and six fixed gears are illustrated in various transmission schematic diagrams (also known as transmission stick diagrams). These schematic diagrams illustrate the topology, packaging, and location of planetary gear sets, clutches, motors, shafts, and the like. The schematic diagram is a visual representation of a cross-section of a transmission showing positioning and in what manner components are supported and interconnected. Additionally, the schematic diagrams show how various clutches and brakes are positioned and supported between or adjacent to planetary gear sets. Those of ordinary skill in the art recognize the schematic diagrams correspond to actual implementations of planetary gear sets, engines, clutches, and the like.

Figure 1:
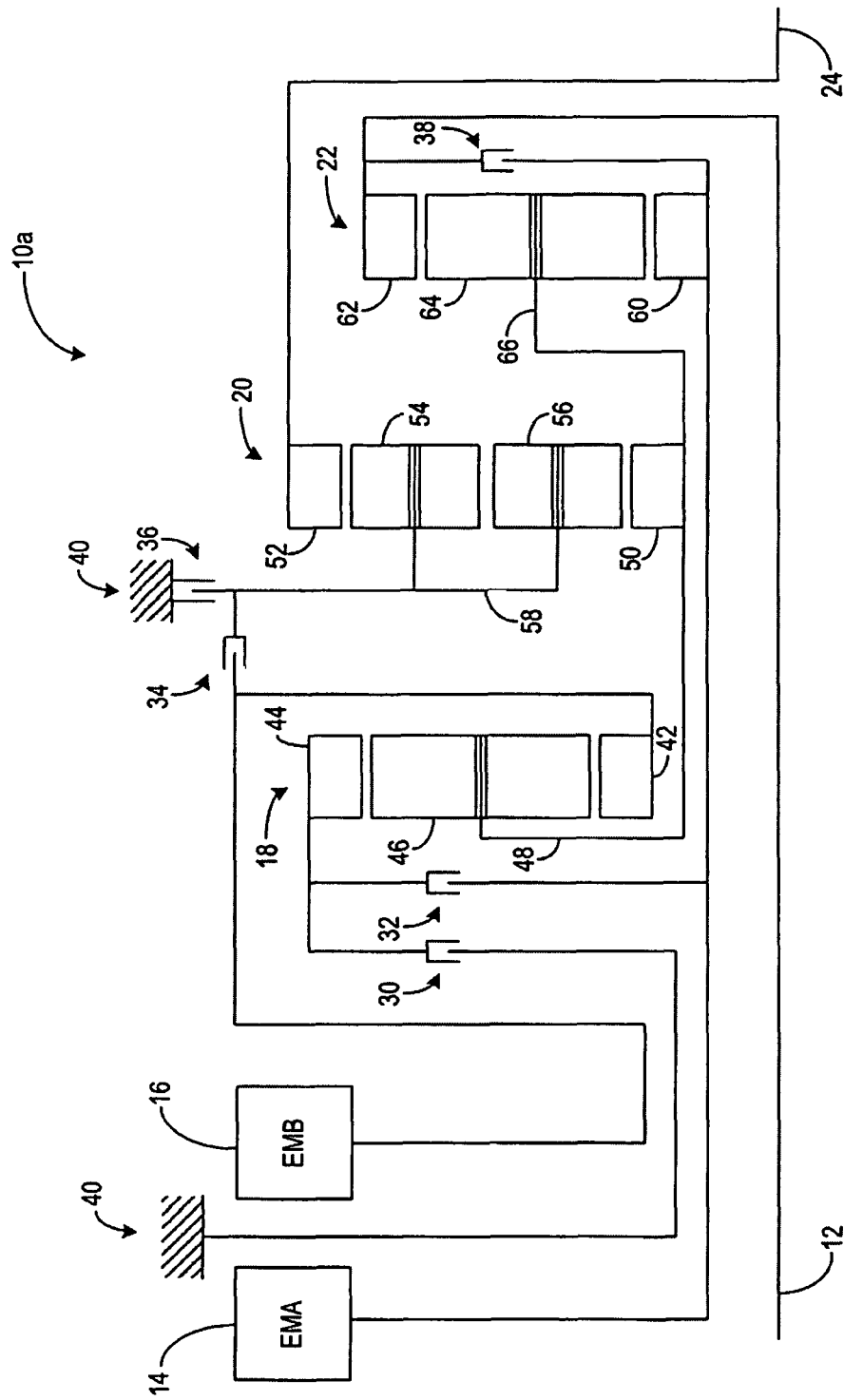
FIG. 1 is a schematic diagram of a power split transmission including two E-motors located in front of three planetary gear sets according to an exemplary embodiment of the present disclosure.

Referring to FIG. 1, a power split transmission 10a includes an input shaft 12, a first E-motor ("EMA") 14, a second E-motor ("EMB") 16, a first planetary gear set 18, a second planetary gear set 20, a third planetary gear set 22, and an output shaft 24, according to an exemplary embodiment of the present disclosure. The input shaft 12 can be connected to an engine, such as ah internal combustion engine. The engine is configured to provide mechanical power to the input shaft 12. The output shaft 24 can connect to a vehicle's wheels, for example. The EMA 14 and EMB 16 are configured for generating and motoring: in order to operate in variable ratios in different EVT modes.

The power split transmission 10a includes five clutches 30, 32, 34, 36, and 38 which are torque transmitting mechanisms. The clutches 30, 32, 34, 36, and 38 are configured to selectively engage and disengage to select fixed gear ratios and EVT modes. For example, all single and double shifts can be performed by shifting from one clutch 30, 32, 34, 36, and 38 to another. The clutches 30, 32, 34, 36, and 38 are configured to be selectively engaged, and can be operated mechanically, electrically, or hydraulically, as is known in the art. The clutches 30 and 36 are configured to connect to a transmission housing 40. The clutches 30, 32, 34, 36, and 38 are configured to hold various components in the planetary gear sets 18, 20, and 22 to engage various gear ratios and EVT modes.

In this exemplary embodiment, the first and third planetary gear sets 18 and 22 are simple planetary gear sets, and the second planetary gear set 20 is a compound planetary gear set. The first planetary gear set 18 includes a sun gear 42, a ring gear 44, a planetary pinion 46, and a planetary carrier 48. The planetary pinion 46 is rotatably mounted on the planetary carrier 48 disposed in a meshing relationship with the sun gear 42 and the ring gear 44.

The second planetary gear set 20 includes a sun gear 50, a ring gear 52, planetary pinions 54 and 56, and a planetary carrier 58. The planetary pinions 54 and 56 are rotatably mounted on the planetary carrier 58 disposed in a meshing relationship with the sun gear 50 and the ring gear 52. The third planetary gear set 22 includes a sun gear 60, a ring gear 62, a planetary pinion 64, arid a planetary carrier 66. The planetary pinion 64 is rotatably mounted on the planetary carrier 66 disposed in a meshing relationship with the sun gear 60 and the ring gear 62.

The power split transmission 10a includes a front E-motor design with the EMA 14 and EMB 16 located in front of the three planetary gear sets 18, 20, and 22. This allows the EMA 14 and EMB 16 to be assembled separately from the three planetary gear sets 18, 20, and 22 leading to a modular design. For example, the modular design enables separate manufacturing of the gear sets 18, 20, and 22 from the E-motors 14 and 16.

The power split transmission 10a includes three inner shafts inside the sun gear 42, and the input shaft 12 extends to the, ring gear 62 of the third planetary gear set 22. With regards to the connections in the planetary gear set 18; the; sun gear 42 is connected to the EMB 16 and to the clutch 34. The ring gear 44 is connected to the transmission housing 40 through the dutch 30 and to the EMA 14 through the clutch 32. The planetary carrier 48 is connected to the sun gear 50 of the second planetary gear set 20.

With regards to the connections in the second planetary gear set 20, the sun gear 50 is connected to the planetary carriers 48 and 66 of the first and third planetary gear sets 18 and 22. The ring gear 52 is connected to the output shaft 24. The planetary carrier 58 is connected to the transmission housing 40 through the clutch 36; With regards to connections in the third planetary gear set 22, the sun gear 60 is connected to the ring gear 44 through the clutch 32 and the ring; gear 62 through the clutch 38. The ring gear 62 is connected to the sun gear 60 through the clutch 38 and the input shaft 12. The planetary carrier 66 is connected to the sun gear 50 of the second planetary gear set 20.

Figure 2:
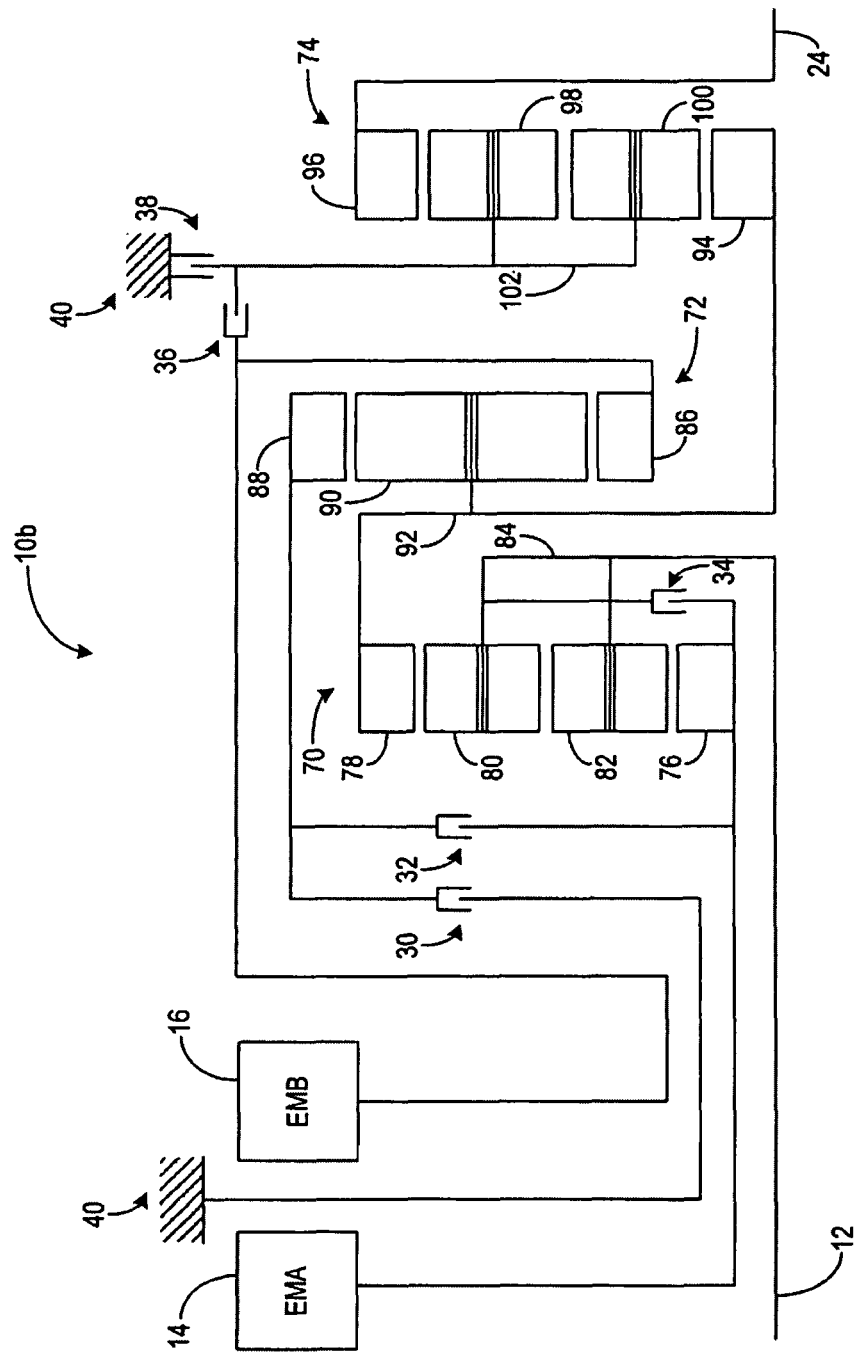
FIG. 2 is a schematic diagram of a power split transmission including two E-motors located in front of three planetary gear sets according to another exemplary embodiment of the present disclosure.

Referring to FIG. 2, a power split transmission 10b includes the input shaft 12, EMA 14, EMB 16, a first planetary gear set 70, a second planetary gear set 72, a third planetary gear set 74, and the output shaft 24, according to an exemplary embodiment of the present disclosure. The input shaft 12 can be connected to an engine, such as, an internal combustion engine. The engine is configured to provide mechanical power to the input shaft 12. The output shaft 24 can connect to a vehicle's wheels, for example. The EMA Hand EMB 16 are configured to generate and store power and to drive in variable ratios in different EVT modes.

The power split transmission 10b includes five clutches 30, 32, 34, 36, and 38 which are torque transmitting mechanisms. The clutches 30, 32, 34, 36, and 38 are configured to selectively engage and disengage to select fixed gear ratios and EVT modes. For example, all single and double shifts can be performed by shifting from one clutch 30, 32, 34, 36, and 38 to another. The clutches 30, 32, 34, 36, and 38 are configured to be selectively engaged, and can be operated mechanically, electrically, or hydraulically, as is known in the art. The clutches 30 arid 36 are configured to connect to a transmission housing 40. The clutches 30, 32, 34, 36, and 38 are configured to hold various components in the planetary gear sets 70, 72, and 74 to engage various gear ratios and EVT modes.

In this exemplary embodiment, the first and third planetary gear sets 70 and 74 are compound planetary gear sets, arid the second planetary gear set 72 is a simple planetary gear set. The first planetary gear set 70 includes a sun gear 76, a ring gear 78, planetary pinions 80 and 82, and a planetary carrier 84. The planetary pinions 80 and 82 are rotatably mounted on the planetary carrier 84 disposed in a meshing relationship with the sun gear 76 and the ring gear 78.

The second planetary gear set 72 includes a sun gear 86, a ring gear 88, a planetary pinion 90, and a planetary carrier 92.

The planetary pinion 90 is rotatably mounted on the planetary carrier 92 disposed in a meshing relationship with the sun gear 86 and the ring gear 88. The third planetary gear set 74 includes a sun gear 94, a ring gear 96, planetary pinions 98 and 100, and a planetary carrier 102. The planetary pinions 98 and 100 are rotatably mounted on the planetary carrier 102 disposed in a meshing relationship with the sun gear 94 and the ring gear 96.

The power split transmission 10b includes a front E-motor design with the EMA 14 and EMB 16 located in front of the three planetary gear sets 70, 72, and 74. This allows the EMA 14 and EMB 16 to be assembled separately from the three planetary gear sets 70, 72, and 74 leading to a modular design. For example, the modular design enables separate manufacturing of the gear sets 70, 72, and 74 from the E-motors Hand 16.

The power split transmission 10b includes one inner shaft inside the sun gear 76, and the input shaft 12 extends to the planetary carrier 84 of the first planetary gear set 70. With regards to the connections in the planetary gear set 70, the sun gear 76 is connected to the EMA 14 and to the planetary carrier 84 through the clutch 34. The ring gear 78 is connected to the planetary carrier 92 and to the sun gear 94. The planetary carrier 84 is connected to the input shaft 12 and to the sun gear 76 through the clutch 34.

With regards to the connections in the planetary gear set 72, the sun gear 86 is connected to the EMB 16, to the transmission housing 40 through clutches 36 and 40, and to the planetary carrier 102; through the clutch 36. The ring gear 88 is connected to the transmission housing 40 through the clutch 30 and to the EMA 14 through the clutch 32. The planetary carrier 92 is connected to the ring gear 78 and to the sun gear 94.

With regards to the connections in the planetary gear set 74, the sun gear 94 is connected to the planetary carrier 92 and to the ring gear 78. The ring gear 96 is connected to the output shaft 24. The planetary carrier 102 is connected to the transmission housing 40 through the clutch 38 and to the Sun gear 86 and EMB 16 through the clutch 36.

The power split transmission 10a of FIG. 1 provides a lower inertial mass design. The power split transmission 10a design has reduced outer shells compared to the power split transmission 10b, and the power split transmission 10b has less inner shafts than the power split transmission 10b.

Also, the power split transmissions 10a and 10b both support four forward EVT modes and six fixed gears through various engagements of the clutches 30, 32, 34, 36, and 38. The four EVT modes have very low power split rations allowing very low powered E-motors and power electronics. The six fixed gears are well-distributed for high transmission efficiency, such as during high-loads.

Figure 3:
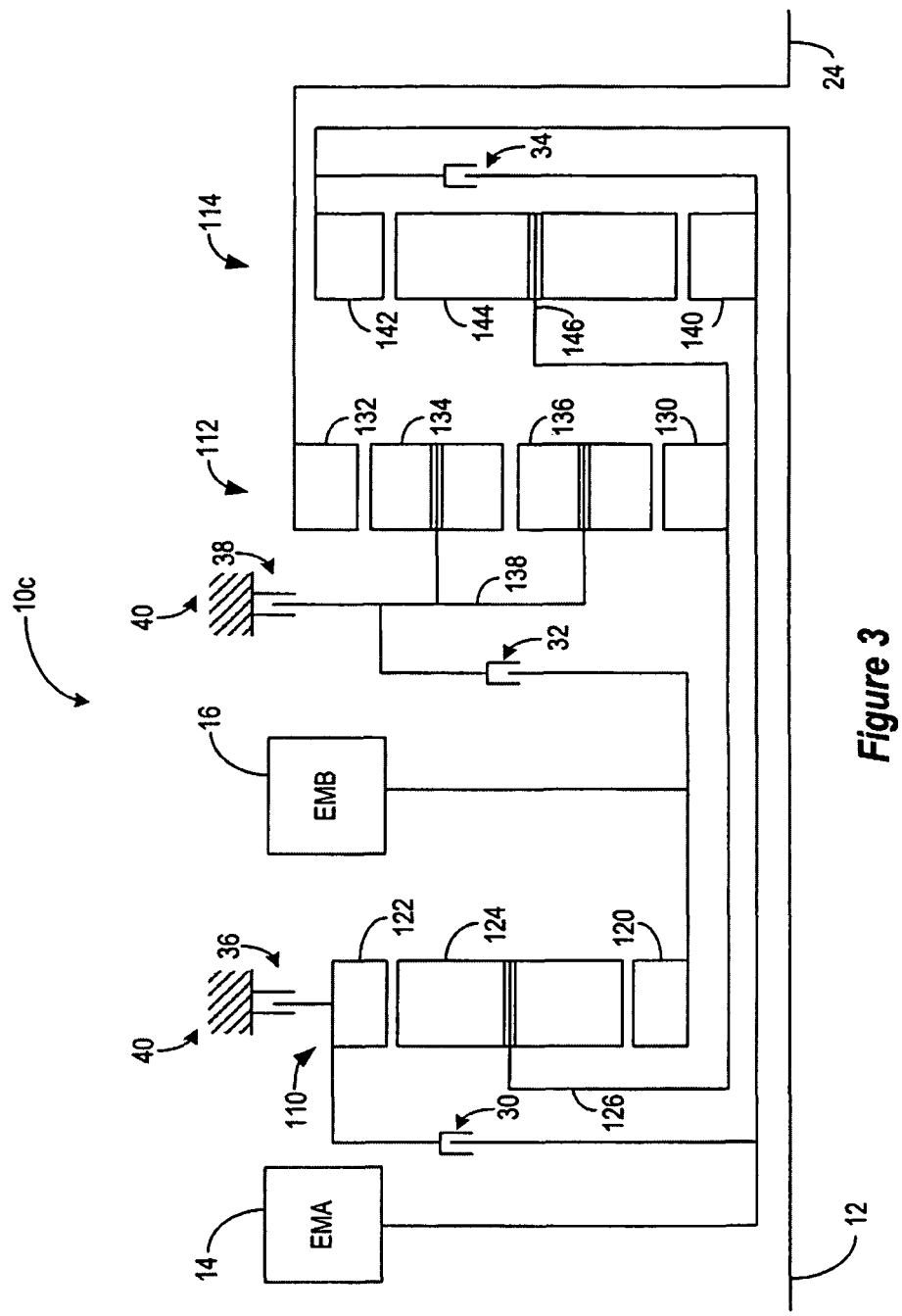
FIG. 3 is a schematic diagram of a power split transmission including two E-motors with one E-motor located in front and one E-motor located in between two planetary gear sets according to yet another exemplary embodiment of the present disclosure.

Referring to FIG. 3, a power split transmission 10c includes the input shaft 12, EMA 14, EMB 16, a first planetary gear set 110, a second planetary gear set 112, a third planetary gear set 114, and the output shaft 24, according to an exemplary embodiment of the present disclosure. The input shaft 12 can be connected to an engine, such as an internal combustion engine. The engine is configured to provide mechanical power to the input shaft 12. The output shaft 24 can, connect to a vehicle's wheels, for example. The EMA 14 and EMB 16 are configured to generate and store power and to drive in variable ratios in different EVT modes. In this exemplary embodiment, the EMA 14 is located in front of the three gear, sets 110, 112, and 114, and the EMB 16 is located in between the first planetary gear set 110 and the second planetary gear set 112.

The power split transmission 10c includes five clutches 30, 32, 34, 36, and 38 which are torque transmitting mechanisms. The clutches 30, 32, 34, 36, and 38 are configured to selectively engage and disengage to select fixed gear ratios and EVT modes. For example, all single and double shifts can be performed by shifting from one clutch 30, 32, 34, 36, and 38 to another. The clutches 30, 32, 34, 36, and 38 are configured to be selectively engaged, and can be operated mechanically, electrically, or hydraulically, as is known in the art. The clutches 36 and 38 are configured to connect to a transmission housing 40. The clutches 30, 32, 34, 36, and 38 are configured to hold various components in the planetary gear sets 110, 112, and 114 to engage various gear ratios and EVT modes.

In this exemplary embodiment, the first and third planetary gear sets 110 and 114 are simple planetary gear sets, and the second planetary gear set 112 is a compound planetary gear set. The first planetary gear set 110 includes a sun gear 120, a ring gear 122, a planetary pinion 124, and a planetary carrier 126. The planetary pinion 124 is rotatably mounted on the planetary carrier 126 disposed in a meshing relationship with the sun gear 120 and the ring gear 122.

The second planetary gear set 112 includes a sun gear 130, a ring gear 132, planetary pinions 134 and 136, and a planetary carrier 138. The planetary pinions 134 and 136 are rotatably mounted on the planetary carrier 138 disposed in a meshing relationship with the sun gear 130 and the ring gear 132. The third planetary gear set 114 includes a sun gear 140, a ring gear 142, a planetary pinion 144, and a planetary carrier 146. The planetary pinion 144 is rotatably mounted on the planetary carrier 146 disposed in a meshing relationship with the sun gear 140 and the ring gear 142.

The power split transmission 10c includes a middle E-motor design with the EMA 14 located in front of the three planetary gear sets 110, 112, and 114, and the EMB 16 located in between the planetary gear sets 110 and 112. The power split transmission 10c includes three inner shafts inside the first planetary gear set 110.

With regards to the connections in the planetary gear set 110, the sun gear 120 is connected to the EMB 16 and to the planetary carrier 138 through the clutch 32. The ring gear 122 is connected to the transmission housing 40 through the clutch 36 and to the EMA 14 and the sun gear, 140 through the clutch 30. The planetary carrier 126 is connected to the sun gear 130.

With regards to the connections in the planetary gear set 112; the sun gear 130 is connected to the planetary carrier 126 and to the planetary carrier 146. The ring gear 132 is connected to the output shaft 24. The planetary carrier 138 is connected to the transmission housing 40 through the clutch 38 and to the EMB 16 and sun gear 120 through the clutch 32.

With regards to the connections in the planetary gear set 114, the sun gear 140 is connected to the EMA 14, to the ring gear 122 through the clutch 30, and to the sun gear 140 through the clutch 34. The ring gear is connected to the input shaft 12 and to the sun gear 140 through the clutch 34. The planetary carrier 146 is connected to the sun gear 130.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An electric variable transmission comprising:
a first, second, and third planetary gear set, wherein the first, second, and third planetary gear sets are interconnected; wherein the first planetary gear set comprises a plurality of first planetary gear subcomponents including a first sun gear, a first ring gear, and a first planetary pinion rotatably mounted on a first planetary carrier, and wherein the third planetary gear set comprises a plurality of third planetary gear subcomponents including a third sun gear, a third ring gear, and a third planetary pinion rotatably mounted on a third planetary carrier;
an input shaft directly connected to the third planetary gear set of the third planetary gear set;
a first electric motor continuously connected to the third planetary gear set, and additionally connected to the first planetary gear set through a first selectively engageable clutch;
a second electric motor continuously connected to the first planetary gear set, and additionally connected to the second planetary gear set through a second selectively engageable clutch;
a transmission housing connected to the first planetary gear set through a third selectively engageable clutch and to the second planetary gear set through a fourth selectively engageable clutch;
a fifth selectively engageable clutch connected to at least two subcomponents on the third planetary gear set;
an output shaft connected to the second planetary gear set; and
wherein the electric variable transmission provides four forward electric variable transmission modes and six fixed gears.

2. The electric variable transmission of claim 1, wherein:
the second planetary gear set comprises a compound planetary gear set.

3. The electric variable transmission of claim 2, wherein the first planetary pinion is disposed in a meshing relationship with the first sun and first ring gears;
wherein the second planetary gear set comprises a plurality of second planetary gear set subcomponents including a second sun gear, a second ring gear, and second planetary pinions rotatably mounted on a second planetary carrier, wherein the second planetary pinions are disposed in a meshing relationship with the second sun and second ring gears; and
wherein the third planetary pinion is disposed in meshing relationship with the third sun and third ring gears.

4. The electric variable transmission of claim 3, wherein connections in the electric variable transmission comprise:
the input shaft connected to the third ring gear;
the first electric motor connected to the third sun gear, and additionally connected to the first ring gear through the first selectively engageable clutch;
the second electric motor connected to the first sun gear, and additionally connected to the second planetary carrier through the second selectively engageable clutch;
the first ring gear connected to the transmission housing through the third selectively engageable clutch;
the first planetary carrier connected to the second sun gear;
the second sun gear connected to the third planetary carrier; the second planetary carrier connected to the transmission housing through the fourth selectively engageable clutch;
the second ring gear connected to the output shaft; and
the third sun gear connected to the third ring gear through the fifth selectively engageable clutch.

5. The electric variable transmission of claim 3, wherein connections in the electric variable transmission comprise:
the input shaft connected to the third ring gear;
the first electric motor connected to the third sun gear, and additionally connected to the first ring gear through the first selectively engageable clutch;
the second electric motor connected to the first sun gear, and additionally connected to the second planetary carrier through the second selectively engageable clutch;
the first ring gear connected to the transmission housing through the third selectively engageable clutch and to the first electric motor and the third sun gear through the first selectively engageable clutch;
the first planetary carrier connected to the second sun gear;
the second sun gear connected to the first planetary carrier and the third planetary carrier;
the second planetary carrier connected to the transmission housing through the fourth selectively engageable clutch;
the second ring gear connected to the output shaft; and
the third ring gear connected to the input shaft and to the third sun gear through the fifth selectively engageable clutch.

6. The electric variable transmission of claim 5, wherein the first electric motor is disposed in front of the first, second, and third planetary gear sets, and wherein the second electric motor is disposed in between the first and second planetary gear sets.

7. The electric variable transmission of claim 5, wherein the four forward electric variable transmission, modes and six fixed gears are selectively engageable through the first, second, third, fourth, and fifth selectively engageable clutches.

8. The electric variable transmission of claim 1, wherein the first and second electric motors are disposed in front of the first, second, and third planetary gear sets.

9. The electric variable transmission of claim 1, wherein the four forward electric variable transmission modes and six fixed gears; are selectively engageable through the first, second, third, fourth, and fifth selectively engageable clutches.

* * * * *